(12) United States Patent
Hoydis et al.

(10) Patent No.: US 12,124,937 B2
(45) Date of Patent: Oct. 22, 2024

(54) LEARNING IN COMMUNICATION SYSTEMS

(71) Applicant: Nokia Technologies Oy, Espoo (FI)

(72) Inventors: Jakob Hoydis, Paris (FR); Ori Shental, Murray Hill, NJ (US)

(73) Assignee: Nokia Technologies Oy, Espoo (FI)

( * ) Notice: Subject to any disclaimer, the term of this patent is extended or adjusted under 35 U.S.C. 154(b) by 822 days.

(21) Appl. No.: 17/295,296

(22) PCT Filed: Nov. 22, 2018

(86) PCT No.: PCT/EP2018/082270
§ 371 (c)(1),
(2) Date: May 19, 2021

(87) PCT Pub. No.: WO2020/104036
PCT Pub. Date: May 28, 2020

(65) Prior Publication Data
US 2022/0004848 A1    Jan. 6, 2022

(51) Int. Cl.
*G06N 3/045*     (2023.01)
*H04B 1/16*      (2006.01)
*H04B 1/00*      (2006.01)

(52) U.S. Cl.
CPC .............. *G06N 3/045* (2023.01); *H04B 1/16* (2013.01); *H04B 1/0003* (2013.01)

(58) Field of Classification Search
CPC .......... G06N 3/045; G06N 3/084; G06N 3/08; G06N 3/063; G06N 3/044; G06N 3/04;
(Continued)

(56) References Cited

U.S. PATENT DOCUMENTS 10,510,358 B1 * 12/2019 Barra-Chicote ........ G10L 13/02
2018/0075347 A1   3/2018 Alistarh .......................... 3/8
(Continued)

FOREIGN PATENT DOCUMENTS

CN    101933268 A    12/2010
EP    3 393 083 A1   10/2018

OTHER PUBLICATIONS

O'Shea, Timothy, et al., "An Introduction to Deep Learning for the Physical Layer", Dec. 1, 2017, IEEE, abstract, 1 pg.
(Continued)

*Primary Examiner* — Ajibola A Akinyemi
(74) *Attorney, Agent, or Firm* — Harrington & Smith

(57) ABSTRACT

An apparatus, method and computer program is described including initialising trainable parameters of a receiver of a transmission system, wherein the receiver includes a demodulation module for demodulating received symbols, a quantization module for generating quantized versions of the demodulated symbols and a decoder for generating a decoded output derived from the quantized versions of the demodulated symbols, wherein the demodulation module has at least some trainable weights and the quantization module has at least some trainable weights; receiving a first training sequence of messages at the receiver; obtaining or generating a loss function; and updating at least some of the trainable parameters of receiver based on the loss function, wherein updating at least some of the trainable parameters of receiver includes updating at least some of the trainable weights of the demodulation module and updating at least some of the trainable weights of the quantization module.

16 Claims, 7 Drawing Sheets

(58) Field of Classification Search
CPC ........ G06N 3/047; G06N 3/048; G06N 3/088; G06N 3/082; G06N 20/00; G06N 3/0495; G06N 3/10; G06N 5/046; G06N 20/10; G06N 3/0464; G06N 7/01; G06N 3/0455; G06N 3/065; G06N 5/04; G06N 3/0475; G06N 3/09
USPC ........................................................ 455/63.1
See application file for complete search history.

(56) References Cited

U.S. PATENT DOCUMENTS

| | | | |
|---|---|---|---|
| 2018/0107926 A1* | 4/2018 | Choi | G06N 3/047 |
| 2018/0308013 A1 | 10/2018 | O'Shea | 99/5 |
| 2018/0314985 A1 | 11/2018 | O'Shea | 99/5 |
| 2019/0138882 A1* | 5/2019 | Choi | G06N 3/048 |

OTHER PUBLICATIONS

Dorner, Sebastian, et al., "Deep Learning-Based Communication Over the Air", Jul. 11, 2017, abstract, 2 pgs.

* cited by examiner

LEARNING IN COMMUNICATION SYSTEMS

CROSS REFERENCE TO RELATED APPLICATION

This patent application is a U.S. National Stage application of International Patent Application Number PCT/EP2018/082270 filed Nov. 22, 2018, which is hereby incorporated by reference in its entirety.

FIELD

The present specification relates to learning in communication systems.

BACKGROUND

A simple communications system includes a transmitter, a transmission channel, and a receiver. Signals for transmission may be encoded and modulated for transmission. Similarly, received signals may be demodulated and decoded. Such functions can be computationally complex.

SUMMARY

In a first aspect, this specification describes an apparatus comprising: means for initialising trainable parameters of a receiver of a transmission system (the transmission system may have a transmitter, a channel and the receiver), wherein the receiver comprises a demodulation module for demodulating received symbols (e.g. the symbols being received from the transmitter of the transmitter system), a quantization module for generating quantized versions of the demodulated symbols and a decoder for generating a decoded output derived from the quantized versions of the demodulated symbols, wherein the demodulation module has at least some trainable weights and the quantization module has at least some trainable weights; means for receiving a first training sequence of messages at the receiver; means for obtaining or generating a loss function; and means for updating at least some of the trainable parameters of the receiver based on the loss function, wherein said means for updating at least some of the trainable parameters of the receiver comprises means for updating at least some of the trainable weights of the demodulation module and means for updating at least some of the trainable weights of the quantization module. The means for initialising the trainable parameters may provide a random initialisation, but this is not essential to all embodiments. Alternative approaches include basing the initialisation on an initial solution (e.g. on a previous solution) such that the training seeks to provide an improvement to the initial/previous solution.

The decoder may have at least some trainable weights and said means for updating at least some of the trainable parameters of the receiver may comprise means for updating at least some of the trainable weights of the decoder. The initial decoder may be an existing (e.g. known) decoder with the trainable weight enabling the initial decoder to be adjusted. In alternative embodiments, the decoder may be fixed.

The demodulation module may comprises means for generating a log-likelihood ratio estimate for received data bits, wherein each log-likelihood ratio is indicative of the probability that the respective bit, as transmitted, had a particular value. By way of example, one or more of the trainable weights of the demodulation module may comprise one or more trainable weights of the log-likelihood ratio estimate generation means.

The quantization module may comprise an approximation of a step function, wherein the trainable weights of the quantization module include one or more weights relating to the degree of approximation of the step function (e.g. how closely the approximation of the step function matches a hard staircase function).

The means for updating at least some of the trainable weights of the quantization module may comprise means for optimising a codebook of the quantization module.

Some embodiments may further comprise means for generating perturbed versions of the quantized versions of the demodulated symbols, wherein the decoder generates the decoded output derived from the perturbed versions of the quantized versions of the demodulated symbols. This arrangement may be particularly useful in embodiments in which the decoder has no trainable parameters and is not differentiable. The perturbations may, for example, be zero-mean Gaussian perturbations. The means for generating perturbed versions of the quantized versions of the demodulated symbols may make use of a distribution to generate perturbations to be applied to the quantized versions of the demodulated symbols.

Some embodiments may further comprise means for repeating the updating of at least some of the trainable parameters of the receiver until a first condition is reached. The first condition may, for example, be a defined number of iterations and/or a defined performance level.

The loss function may be generated based on the first training sequence of messages received at the receiver and knowledge of the training sequence. Alternatively, or in addition, the loss function may be related to one or more of block error rate, bit error rate and categorical cross-entropy.

In some embodiments, said at least some trainable parameters of the receiver may be trained using stochastic gradient descent or reinforcement learning.

The demodulation module may comprise a demodulator neural network (or some other differentiable parametric function). Alternatively, or in addition, the quantization module may comprise a quantization neural network (or some other differentiable parametric function). Alternatively, or in addition, the decoder may comprise a decoder neural network (or some other differentiable parametric function).

The said means may comprise: at least one processor; and at least one memory including computer program code, the at least one memory and the computer program configured, with the at least one processor, to cause the performance of the apparatus.

In a second aspect, this specification describes a method comprising: initialising trainable parameters of a receiver of a transmission system (e.g. a random initialisation), wherein the receiver comprises a demodulation module for demodulating received symbols, a quantization module for generating quantized versions of the demodulated symbols and a decoder for generating a decoded output derived from the quantized versions of the demodulated symbols, wherein the demodulation module has at least some trainable weights and the quantization module has at least some trainable weights; receiving a first training sequence of messages at the receiver; obtaining or generating a loss function; and updating at least some of the trainable parameters of the receiver based on the loss function, wherein updating at least some of the trainable parameters of the receiver comprises updating at least some of the trainable weights of the demodulation module and updating at least some of the trainable weights of the quantization module.

The decoder may have at least some trainable weights and the method may further comprise updating at least some of the trainable parameters trainable weights of the decoder.

The demodulation module may generate a log-likelihood ratio estimate for received data bits, wherein each log-likelihood ratio is indicative of the probability that the respective bit, as transmitted, had a particular value.

Some embodiments may further comprise generating perturbed versions of the quantized versions of the demodulated symbols, wherein the decoder generates the decoded output derived from the perturbed versions of the quantized versions of the demodulated symbols.

The loss function may be generated based on the first training sequence of messages received at the receiver and knowledge of the training sequence. Alternatively, or in addition, the loss function may be related to one or more of block error rate, bit error rate and categorical cross-entropy.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: initialise trainable parameters of a receiver of a transmission system (e.g. a random initialisation), wherein the receiver comprises a demodulation module for demodulating received symbols, a quantization module for generating quantized versions of the demodulated symbols and a decoder for generating a decoded output derived from the quantized versions of the demodulated symbols, wherein the demodulation module has at least some trainable weights and the quantization module has at least some trainable weights; receive a first training sequence of messages at the receiver; obtain or generate a loss function; and update at least some of the trainable parameters of the receiver based on the loss function, wherein updating at least some of the trainable parameters of the receiver comprises updating at least some of the trainable weights of the demodulation module and updating at least some of the trainable weights of the quantization module.

In a sixth aspect, this specification describes a computer-readable medium (such as a non-transitory computer readable medium) comprising program instructions stored thereon for performing at least the following: initialising trainable parameters of a receiver of a transmission system (e.g. a random initialisation), wherein the receiver comprises a demodulation module for demodulating received symbols, a quantization module for generating quantized versions of the demodulated symbols and a decoder for generating a decoded output derived from the quantized versions of the demodulated symbols, wherein the demodulation module has at least some trainable weights and the quantization module has at least some trainable weights; receiving a first training sequence of messages at the receiver; obtaining or generating a loss function; and updating at least some of the trainable parameters of the receiver based on the loss function, wherein updating at least some of the trainable parameters of the receiver comprises updating at least some of the trainable weights of the demodulation module and updating at least some of the trainable weights of the quantization module.

In a seventh aspect, this specification describes an apparatus comprising: at least one processor; and at least one memory including computer program code which, when executed by the at least one processor, causes the apparatus to: initialise trainable parameters of a receiver of a transmission system, wherein the receiver comprises a demodulation module for demodulating received symbols, a quantization module for generating quantized versions of the demodulated symbols and a decoder for generating a decoded output derived from the quantized versions of the demodulated symbols, wherein the demodulation module has at least some trainable weights and the quantization module has at least some trainable weights; receive a first training sequence of messages at the receiver; obtain or generate a loss function; and update at least some of the trainable parameters of the receiver based on the loss function, wherein updating at least some of the trainable parameters of the receiver comprises updating at least some of the trainable weights of the demodulation module and updating at least some of the trainable weights of the quantization module.

In an eighth aspect, this specification describes an apparatus comprising: an initialisation module for initialising trainable parameters of a receiver of a transmission system (the transmission system may have a transmitter, a channel and the receiver), wherein the receiver comprises a demodulation module for demodulating received symbols (e.g. the symbols being received from the transmitter of the transmitter system), a quantization module for generating quantized versions of the demodulated symbols and a decoder for generating a decoded output derived from the quantized versions of the demodulated symbols, wherein the demodulation module has at least some trainable weights and the quantization module has at least some trainable weights; a receiver input for receiving a first training sequence of messages at the receiver; a loss function module for obtaining or generating a loss function; and a control module for updating at least some of the trainable parameters of the receiver based on the loss function, wherein said control module is configured to update at least some of the trainable weights of the demodulation module and to update at least some of the trainable weights of the quantization module.

BRIEF DESCRIPTION OF THE DRAWINGS

Example embodiments will now be described, by way of non-limiting examples, with reference to the following schematic drawings, in which.

DETAILED DESCRIPTION

Figure 1:
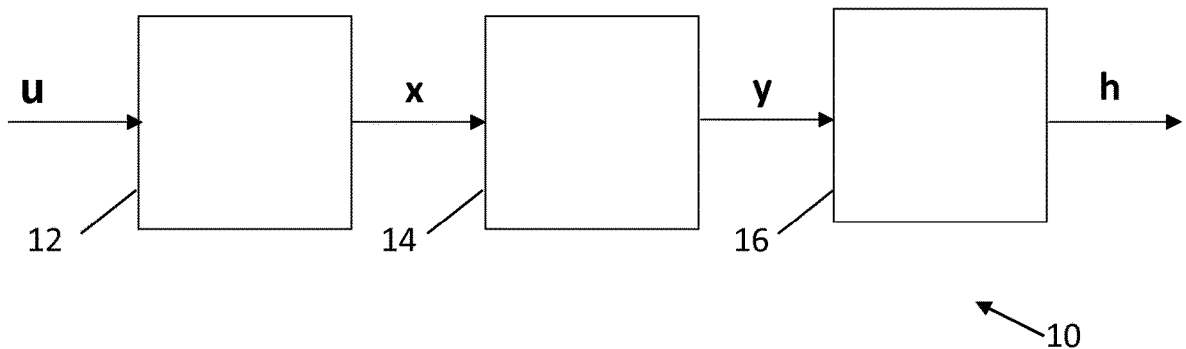
FIG. 1 is a block diagram of an example end-to-end communication system.

FIG. 1 is a block diagram of an example end-to-end communication system, indicated generally by the reference numeral 10. The system 10 includes a transmitter 12, a channel 14 and a receiver 16. Viewed at a system level, the system 1 converts information bits u received at the input to the transmitter 12 into an output h at the output of the receiver 16.

Figure 2:
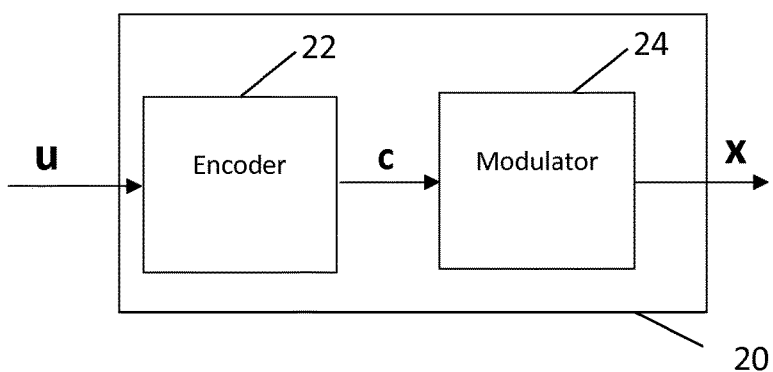
FIG. 2 is a block diagram of an example transmitter.

FIG. 2 is a block diagram of an example transmitter 20. The transmitter is an example implementation of the transmitter 12 of the system 10 described above with reference to FIG. 1. As shown in FIG. 2, the transmitter 20 comprises an encoder 22 and a modulator 24.

The encoder 22 receives, at an input, a binary vector of k information bits $u \in \mathbb{B}^k$, wherein $\mathbb{B} = \{0,1\}$, and produces as an output a binary vector of n coded bits $c \in \mathbb{B}^n$. The encoder 22 may also perform scrambling and/or interleaving of the coded bits.

The modulator 24 converts blocks of bits into symbols x (e.g. constellations points) for transmission (for example over the channel 14).

In one example implementation, the modulator 24 transforms blocks $c_i = [c_{(i-1)M+1}, \ldots, c_{iM}]^T \in \mathbb{B}^M$, $i=1, \ldots, n/M$, of M adjacent coded bits to modulated symbols $x_i \in C$, where $C \subset \mathbb{C}^N$ may be an arbitrary finite set of constellation points. It may be assumed that n/M is an integer. It may be further assumed that all possible M-bit sequences are equiprobable, such that a probability of occurrence of each of a plurality of modulated symbols in the set of constellation points C is approximately the same. In one example, N=1 is used. In this example, the conversion by the modulator 24 may comprise one or more of: a binary phase-shift keying (BPSK) with $C_{BPSK}=\{-1,1\}$; quadrature phase-shift keying (QPSK) with $\mathbb{C}_{CPSK}=\{\pm 1/\sqrt{2} \pm i/\sqrt{2}\}$, where $i=\sqrt{-1}$ is an imaginary unit; and quadrature amplitude modulation (QAM). Higher order modulation formats, that is N>1, may also be possible. The symbols x may be a vector, such that $$x = [x_1^T, \ldots, x_{n/M}^T]^T \in \mathbb{C}^{\frac{Nn}{M}},$$

and the vector is then transmitted through a channel, such as channel 14.

In one example, the transmission through the channel may further comprise one or more of pulse-shaping, Gray coding, precoding for transmission with multiple antennas for multiple-input multiple-output (MIMO) systems, mapping to orthogonal frequency-division multiplexing (OFDM) or other multicarrier waveforms, digital-to-analog conversion (DAC), and mixing on a radio carrier.

The symbols x are sent through the channel 14, and the channel provides symbols $$y \in \mathbb{C}^{\frac{Nn}{M}}$$

to the input of the decoder 16. The channel 14 may perform one or more steps for obtaining such observation, where the one or more steps may comprise analog-to-digital conversion (ADC), down-mixing to the baseband, synchronisation, filtering, OFDM demodulation (or demodulation of other waveforms), channel estimation, receive combining for MIMO systems, equalization, and/or the like. These steps are captured by the relation between symbols x and y.

Figure 3:
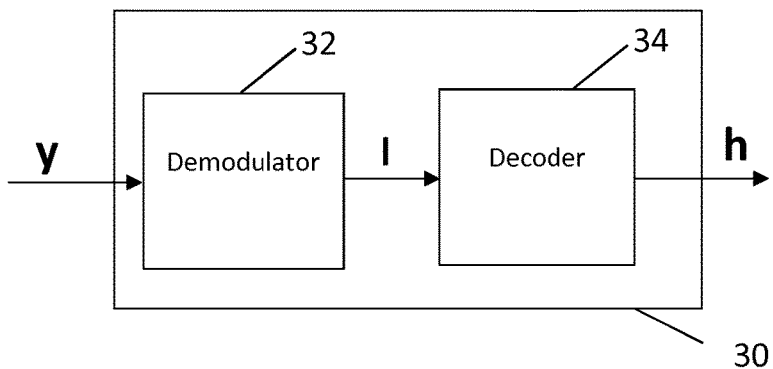
FIG. 3 is a block diagram of an example receiver.

FIG. 3 is a block diagram of an example receiver 30. The receiver 30 is an example implementation of the receiver 16 of the system 10 described above with reference to FIG. 1. As shown in FIG. 3, the receiver 16 comprises a demodulator 32 and a decoder 34.

The demodulator 32 receives symbols y and provides outputs l indicative of the probability that particular bits have particular values (as discussed further below). The decoder maps the demodulator outputs l to estimates h of all coded bits.

In an example implementation, the demodulator 32 maps blocks $y_i = [y_{(i-1)N+1}, \ldots, y_{iN}]^T \in \mathbb{C}^N$, $i=1, \ldots, n/M$, of N adjacent channel outputs to vectors of initial estimates of log-likelihood ratios (LLRs) vectors $l_i \in \mathbb{R}^M$ for each coded bit in $c_i$, as illustrated in equation 1.

$$[l_i]_j = \log\left(\frac{Pr([c_i]_j = 0 | y_i)}{Pr([c_i]_j = 1 | y_i)}\right), j = 1, \ldots, M \quad \text{Equation 1}$$

A stacked vector of all LLRs may be denoted by $l = [l_1^T, \ldots, l_{n/M}^T]^T \in \mathbb{R}^n$.

In one example, an exact demodulator or demapper (from constellation points to LLRs) may take the following form:

$$[l_i]_j = \log\left(\frac{\sum_{x \in C_j^0} e^{-\frac{\|x-y_i\|_2^2}{\sigma^2}}}{\sum_{x \in C_j^1} e^{-\frac{\|x-y_i\|_2^2}{\sigma^2}}}\right)$$

where $C_j^\delta \subset C$ is a subset of constellation points for which the jth bit is equal to $\delta \in \{0,1\}$ and $\sigma^2$ is an estimate of a noise variance of the channel. The demapper may be based on an assumption of an additive white Gaussian noise (AWGN) channel and perfect equalization of the channel, which may not be feasible in a practical system. The computational complexity of the LLRs may depend on the size of the constellation $|C|=2^M$. A reduced-complexity version of the exact demapper may be as illustrated in equation 2, which may be implemented as a lookup table (LUT).

$$[l_i]_j \approx \frac{\min_{x \in C_j^1}\|x-y_i\|_2^2 - \min_{x \in C_j^0}\|x-y_i\|_2^2}{\sigma^2} \quad \text{Equation 2}$$

In one example implementation, the decoder 34 may map l to an estimate $h = \mathbb{R}^n$ of the LLRs of all coded bits given a full observation of y, as illustrated in equation 3.

$$h_j = \log\left(\frac{Pr(c_j = 0 | y)}{Pr(c_j = 1 | y)}\right), \quad j = 1, \ldots, n \quad \text{Equation 3}$$

A decoding function may be denoted as $d: \mathbb{R}^n \mapsto \mathbb{R}^n$. The LLRs may be used to compute hard decisions $\hat{c} \in \mathbb{B}^n$ of the transmitted coded bits according to equation 4.

$$\hat{c}_j = \begin{cases} 0 & h_j \geq 0 \\ 1 & h_j < 0 \end{cases}, \quad j = 1, \ldots, n \qquad \text{Equation 4}$$

These hard-decisions may then be used for computing estimates $\hat{u} \in \mathbb{B}^k$ of the information bits u.

In one example implementation, a decoder (such as a log-domain belief propagation (BP) decoder) is provided for a low-density parity-check (LDPC) code. In this example, $H \in \mathbb{B}^{k \times n}$ may be a parity check matrix of such a LDPC code. A Tanner graph defined by H may be defined as G=(V, C, E), where V=[1, ..., n] and C=[1, ..., m] are sets of variable and check nodes, respectively, and E={(i, j)∈ C×V|$H_{i,j}$=1} is a set of edges. Sets of outgoing edges may be defined for each check and variable node according to equations 5 and 6 respectively.

$$A(i)=\{j \in V | H_{i,j}=1\}, \; i \in C \qquad \text{Equation 5:}$$

$$B(j)=\{i \in C | H_{i,j}=1\}, \; j \in V \qquad \text{Equation 6:}$$

A log-domain belief-propagation (BP) algorithm may work according to iterative message exchanges between all variable and check nodes according to equations 7 and 8 respectively for t=0, 1, ..., and $\alpha_{i \to j}^{(0)}=0$ for all i, j.

$$\beta_{j \to i}^{(t)} = l_j + \sum_{k \in B(j) \setminus i} a_{k \to j}^{(t)} \qquad \text{Equation 7}$$

$$\alpha_{i \to j}^{(t+1)} = 2 \tanh^{-1} \left( \prod_{k \in A(i) \setminus j} \tanh\left(\frac{1}{2} \beta_{k \to i}^{(t)}\right) \right) \qquad \text{Equation 8}$$

The iterative message exchanges may be stopped after a maximum number of iterations $t_{max}$ is reached or whenever computation of h (as provided in equation 9) corresponds to a valid codeword. The final output of the log-domain BP algorithm is illustrated in equation 9, as follows:

$$h_j = l_j + \sum_{k \in B(j)} a_{k \to j}^{(t_{max})}, \quad j = 1, \ldots, n \qquad \text{Equation 9}$$

The output of equation 9 may alternatively or additionally be evaluated for every iteration by replacing $t_{max}$ by t.

Computing log-likelihood ratios (LLRs) values by the demodulator 32 is typically a complex task. It can therefore be difficult to provide high performance demodulator algorithms.

As discussed further below, practical implementations of the receiver typically quantize the LLR output of the demodulator to provide a quantized output $\bar{l}$, so that each element $\bar{l}_i$ takes only values in a finite set $\mathcal{L} = \{\ell_1, \ell_1 \ldots \ell_Q\}$ of Q possible LLR values. In the most extreme cases, $\mathcal{L}$ has only two members, e.g. $\mathcal{L}=\{-1,1\}$, which is also called hard-decision demapping. In general, Q=$2^q$, where q is the number of bits used to represent the different members of $\mathcal{L}$. Other options are possible. Choosing the right quantization codebook $\mathcal{L}$ as well as the quantization mapping Π: $\mathbb{R} \to \mathcal{L}$, i.e. $\bar{l}_i=\Pi(l_i)$, is non-trivial and has significant impact on the bit error rate (BER).

In many cases, channel decoding algorithms (such as belief propagation) perform optimally under the assumption of unquantized and perfect LLRs. However, performance generally degrades when either the assumptions of perfect equalization and AWGN channels do not hold or when quantized LLRs are used.

Figure 4:
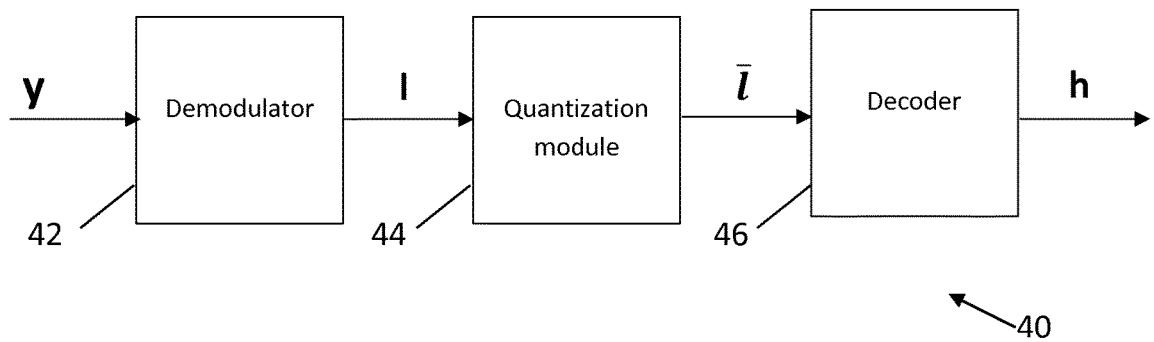
FIG. 4 is a block diagram of a receiver for use in an end-to-end communication system in accordance with an example embodiment.

FIG. 4 is a block diagram of a receiver, indicated generally by the reference numeral 40, for use in an end-to-end communication system in accordance with an example embodiment.

The receiver 40 comprises a demodulator 42, a quantization module 44 and a decoder 46. Thus, the demodulator 42 may be provided for demodulating received symbols (e.g. constellation points) received from a transmitter (such as the transmitter 12), the quantization module 44 may be provided for generating quantized versions of the demodulated symbols and the decoder 46 may be provided for generating a decoded output derived from the quantized versions of the demodulated symbols.

One or more of the demodulator 42, quantization module 44 and decoder 46 may be trainable (e.g. including at least some trainable weights). For example, the trainable weights of the demodulator 42, quantization module 44 and decoder 46 may be given by $\theta_f$, $\theta_g$ and $\theta_d$ respectively. As discussed further below, one or more of the demodulator 42, the quantization module 44 and the decoder 46 may include a neural network (or some other differentiable parametric function).

The demodulator 42 may be implemented using a neural network (or another differentiable parametric function) $f_{\theta_f}$: $\mathbb{C}^N \mapsto \mathbb{R}^M$ which maps the channel output $y_i$ to an M-dimensional real-valued vector. $\theta_f$ are trainable parameters of the neural network in this example. Thus, $l_i=f_{\theta_f}(y_i)$. In some scenarios, the observation $y \in \mathbb{C}^N$ may be received over multiple antennas, such that the demodulator 42 implicitly carries out some form of MIMO demodulation.

The quantization module 44 may, for example, quantize vector $l_i$, by implementing a soft staircase function, where a quantized vector $\bar{l}_i$ is computed according to equation 10.

$$[\bar{l}_i]_j = g_{\theta_g}([l_i]_j) \triangleq \frac{\sum_{\ell \in \mathcal{L}} \ell \exp\left(-\frac{|\ell - [l_i]_j|^2}{\gamma}\right)}{\sum_{\ell \in \mathcal{L}} \exp\left(-\frac{|\ell - [l_i]_j|^2}{\gamma}\right)} \qquad \text{Equation 10}$$

where γ>0 is a hyper-parameter and the members of $\mathcal{L}$ are trainable parameters, i.e. $\theta_g=\{\mathcal{L}\}$. It is also possible to assume a fixed quantization codebook $\mathcal{L}^*$ and to only learn a global scaling factor α, as illustrated in equation 11.

$$[\bar{l}_i]_j = \alpha \frac{\sum_{\ell \in \mathcal{L}^*} \ell \exp\left(-\frac{|\ell - [l_i]_j|^2}{\gamma}\right)}{\sum_{\ell \in \mathcal{L}^*} \exp\left(-\frac{|\ell - [l_i]_j|^2}{\gamma}\right)} \qquad \text{Equation 11}$$

In case of equation 11, $\theta_g=\{\alpha\}$. The function $g_{\theta_g}$ may be applied simultaneously on all elements of $l_i$. This may be compactly written as illustrated in equation 12.

$$\bar{l}_i = g_{\theta_g}(l_i) \qquad \text{Equation 12:}$$

The smaller the α, the more closely $g_{\theta_g}()$ may correspond to a hard staircase function.

The vector $\bar{l}=[\bar{l}_1, \ldots, \bar{l}_{n/M}]^T$ may be mapped by the decoder 46 to the LLRs of all coded bits h, as defined above, i.e. $h=d(\bar{l})$. The example embodiments may work for all decoding functions d. However, the training procedure may differ based on whether d is differentiable or not, such that if d is differentiable, it is differentiable with respect to its inputs. Some examples include sum-product, max-product, or the Viterbi algorithm. In some examples, the decoding function may be enriched with trainable parameters $\theta_d$ such that $h=d_{\theta_d}(l)$. An example for LDPC codes is provided below.

The log-domain BP algorithm with trainable parameters works according to iterative message exchanges between all variable and check nodes for $t=0, 1, \ldots$, and $\alpha_{i \to j}^{(0)}=0$ for all i, j, as illustrated in equations 13 and 14 respectively.

$$\beta_{j \to i}^{(t)} = v_j^{(t)} l_j + \sum_{k \in B(j) \setminus i} \omega_{k,j}^{(t)} \alpha_{k \to j}^{(t)} \qquad \text{Equation 13}$$

$$\alpha_{i \to j}^{(t+1)} = 2\tanh^{-1}\left(\prod_{k \in A(i) \setminus j} \tanh\left(\frac{1}{2}\beta_{k \to i}^{(t)}\right)\right) \qquad \text{Equation 14}$$

The iterative message exchange may be stopped after a maximum number of iterations $t_{max}$ is reached or whenever computation of h (as provided in equation 9) corresponds to a valid codeword. The final output of this algorithm is illustrated in equation 15.

$$h_j = \sigma\left(v_j^{(t_{max})} l_j + \sum_{k \in B(j)} \omega_{k,j}^{(t_{max})} \alpha_{k \to j}^{(t_{max})}\right), \; j = 1, \ldots, n \qquad \text{Equation 15}$$

where $\sigma(x)=(1+\exp(-x))^{-1}$ is the sigmoid function. In this algorithm, the trainable parameters are $\theta_d=\{v_j^{(t)}, w_{i,j}^{(t)} | t \in [0, t_{max}], i \in C, j \in V\}$. If all trainable parameters are set equal to one, the original BP algorithm as described in equations 5-9 is recovered. In some examples, the parameters are not indexed by the iteration (t) number and hence re-used in each iteration, such that $\theta_d=\{v_j, w_{i,j} | i \in C, j \in V\}$.

Figure 5:
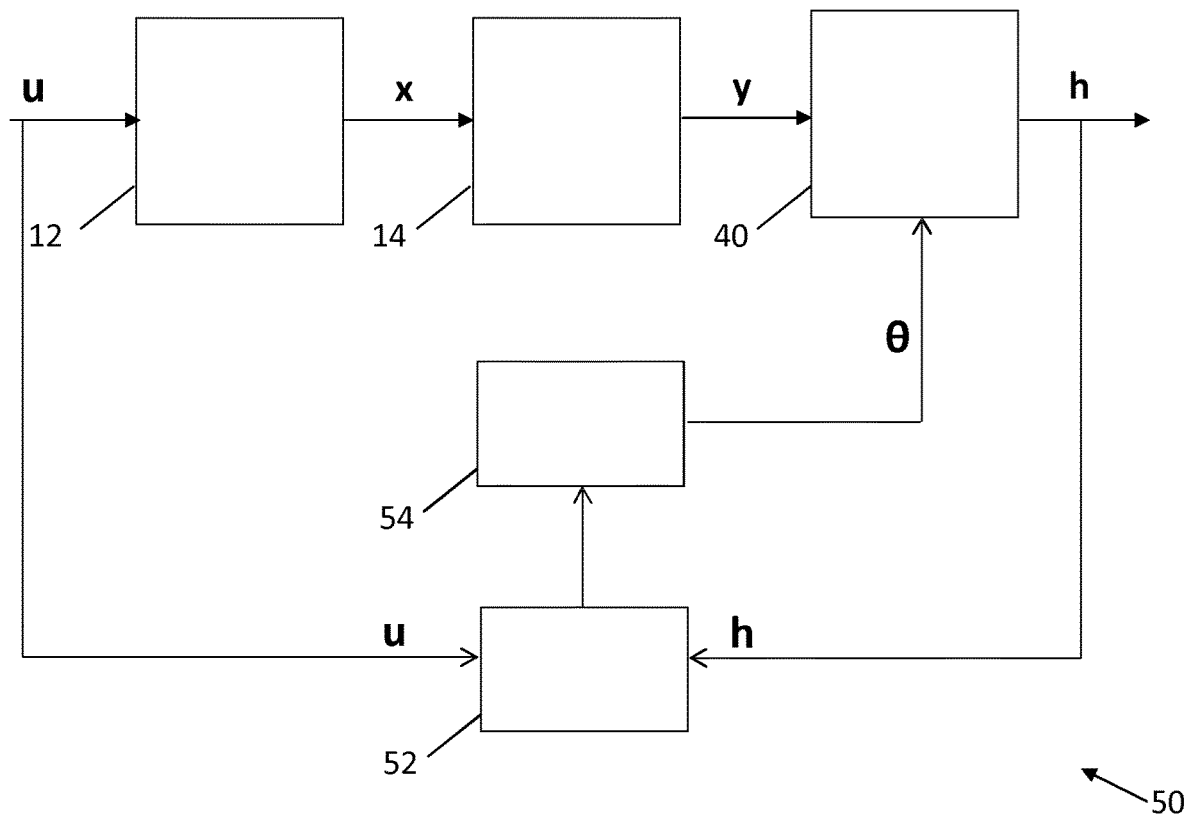
FIG. 5 is a block diagram of an example training system in accordance with an example embodiment.

FIG. 5 is a block diagram of an example training system, indicated generally by the reference numeral 50, in accordance with an example embodiment. The training system 50 comprises the transmitter 12 and the channel 14 of the system 10 described above and further comprises the receiver 40 described above. The training system 50 further comprises a loss function module 52 and a learning algorithm module 54. As discussed in detail below, the learning algorithm module 54 is used to update trainable parameters of the receiver 40.

As discussed above, the demodulation module 42 may comprise means for generating a log-likelihood ratio (LLR) estimate for received data bits, wherein each log-likelihood ratio is indicative of the probability that the respective bit, as transmitted, had a particular value. One or more of the trainable weights of the demodulation module 42 may comprise one or more trainable weights of the log-likelihood ratio estimate generation means.

As discussed above, the quantization module 44 may comprise an approximation of a step function. One or more of the trainable weights of the quantization module may include one or more weights relating to the degree of approximation of the step function.

Figure 6:
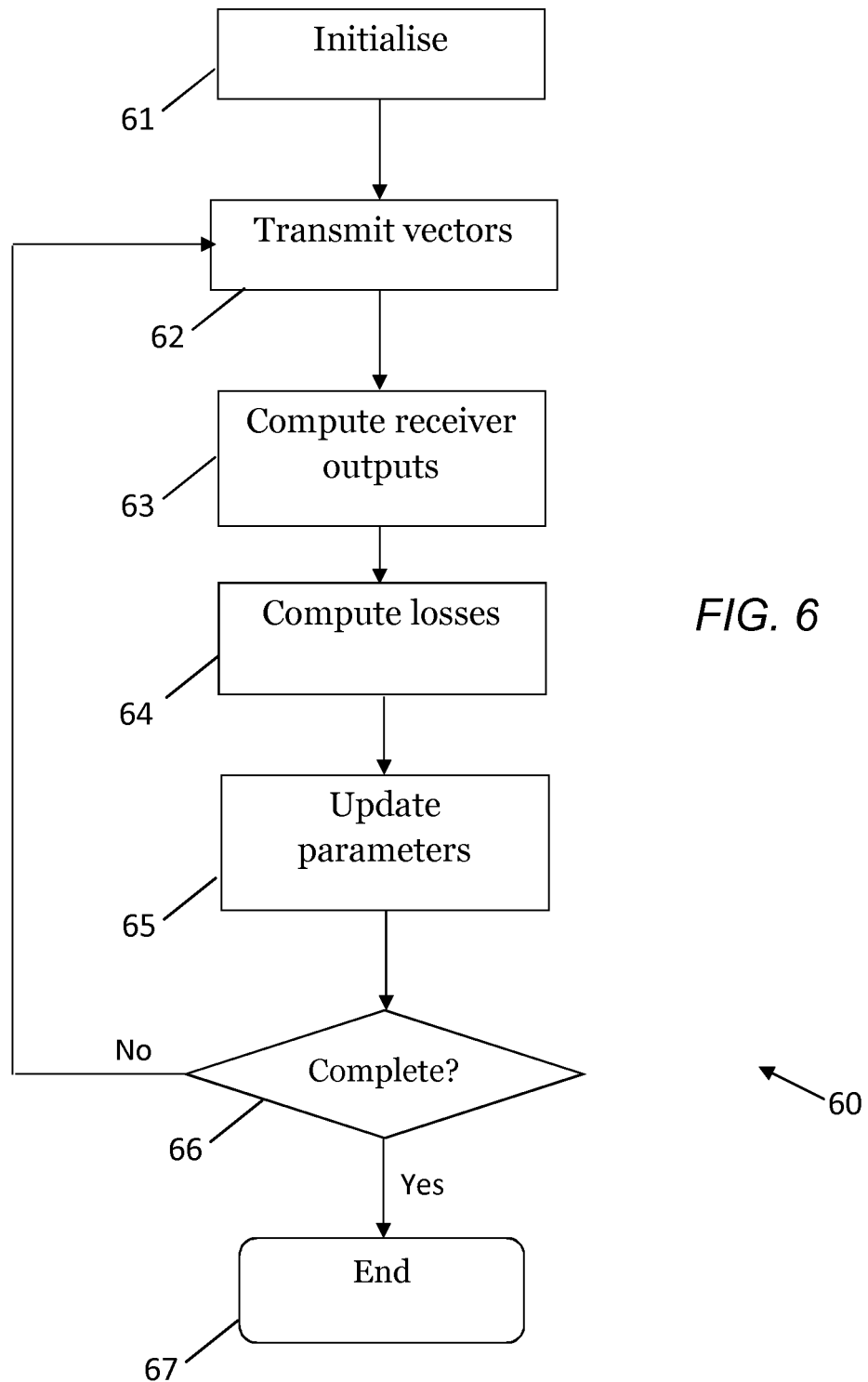
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 may be implemented using the system 50.

The algorithm 60 starts at operation 61, where parameters of the receiver 40 of a transmission system (e.g. including the transmitter 12, channel 14 and receiver 40) are initialised. The initialisation at operation 61 may take many forms, including a random (or pseudo-random) initialisation, or using (or being based on) a previously known receiver configuration. In initialisation operation 61 may involve initialising trainable parameters $\theta$ that may include one or more of the parameters $\theta_f$, $\theta_g$ and $\theta_d$, (e.g. $\theta=(\theta_f+\theta_g+\theta_d)$).

At operation 62, a set of training vectors are transmitted by the transmitter 12. In order to generate the set of training vectors, a batch of B random binary vectors $u^{(b)}$, $b=1, \ldots, B$ may be generated and transmitted through the channel 14 to the receiver 40. The corresponding vectors of encoded bits are denoted $c^{(b)}$.

At operation 63, the receiver outputs $h^{(b)}$ corresponding to each transmission $y^{(b)}$ are computed (for $b=1, \ldots, B$), as illustrated in equation 17.

$$h^{(b)}=h_\theta(y^{(b)}) \qquad \text{Equation 17:}$$

At operation 64, a loss function $L(\theta)$ is obtained or generated. The loss function may be generated based on the first training sequence of messages as received at the loss function module 52 and knowledge of the training sequence as received at the loss function module 52. The loss function may, for example, be related to one or more of block error rate, bit error rate and categorical cross-entropy.

In one example embodiment, the loss function is generated based on mean-squared error, as illustrated in equation 18.

$$L^{MSE}(\theta) = \frac{1}{B}\sum_{b=1}^{B} \|c^{(b)} - h^{(b)}\|_2^2 \qquad \text{Equation 18}$$

Alternatively, the loss function may be generated based on cross-entropy (CE), as illustrated in equation 19.

$$L^{CE}(\theta) = -\frac{1}{B}\sum_{b=1}^{B}\sum_{\ell=1}^{k} c_\ell^{(b)} \log(h_\ell^{(b)}) + (1-c_\ell^{(b)})\log(1-h_\ell^{(b)}). \qquad \text{Equation 19}$$

At operation 65, at least some of the trainable parameters of receiver are updated based on the loss function, for example using stochastic gradient descent or reinforcement learning (e.g. updating at least some of the trainable weights of the demodulation module and/or at least some of the trainable weights of the quantization module and/or at least some of the trainable weights of the decoder). For example, one step of stochastic gradient descent (SGD) may be applied to the trainable parameters (or weights) of the neural network(s).

The operation 65 may involve updated the parameters $\theta$ as illustrated in equation 20.

$$\theta = \theta - \alpha \nabla_\theta L(\theta) \qquad \text{Equation 20:}$$

where $\alpha > 0$ is the learning rate and $L(\theta)$ is a loss function, such as the mean squared error (MSE).

At operation 66, a determination is made regarding whether the algorithm 60 is complete. If so, the algorithm terminates at operation 67; otherwise, the algorithm returns to operation 62 and the operations 62 to 66 are repeated. The operation 66 may determine that the algorithm is complete in a number of ways, such as after a number of interactions of the operations 62 to 66 have been completed, if the loss has reached or is below a certain value, if the loss has not decreased over a fixed number of iterations etc.

In the examples described above, it has generally been assumed that the decoder has at least some trainable weights. For example, in the receiver 40, it has generally been assumed that the trainable weights of the demodulator 42, quantization module 44 and decoder 46 can be trained together. This is not essential to all embodiments. Indeed, in some embodiments, the decoder 46 is fixed (and may not be differentiable).

Figure 7:
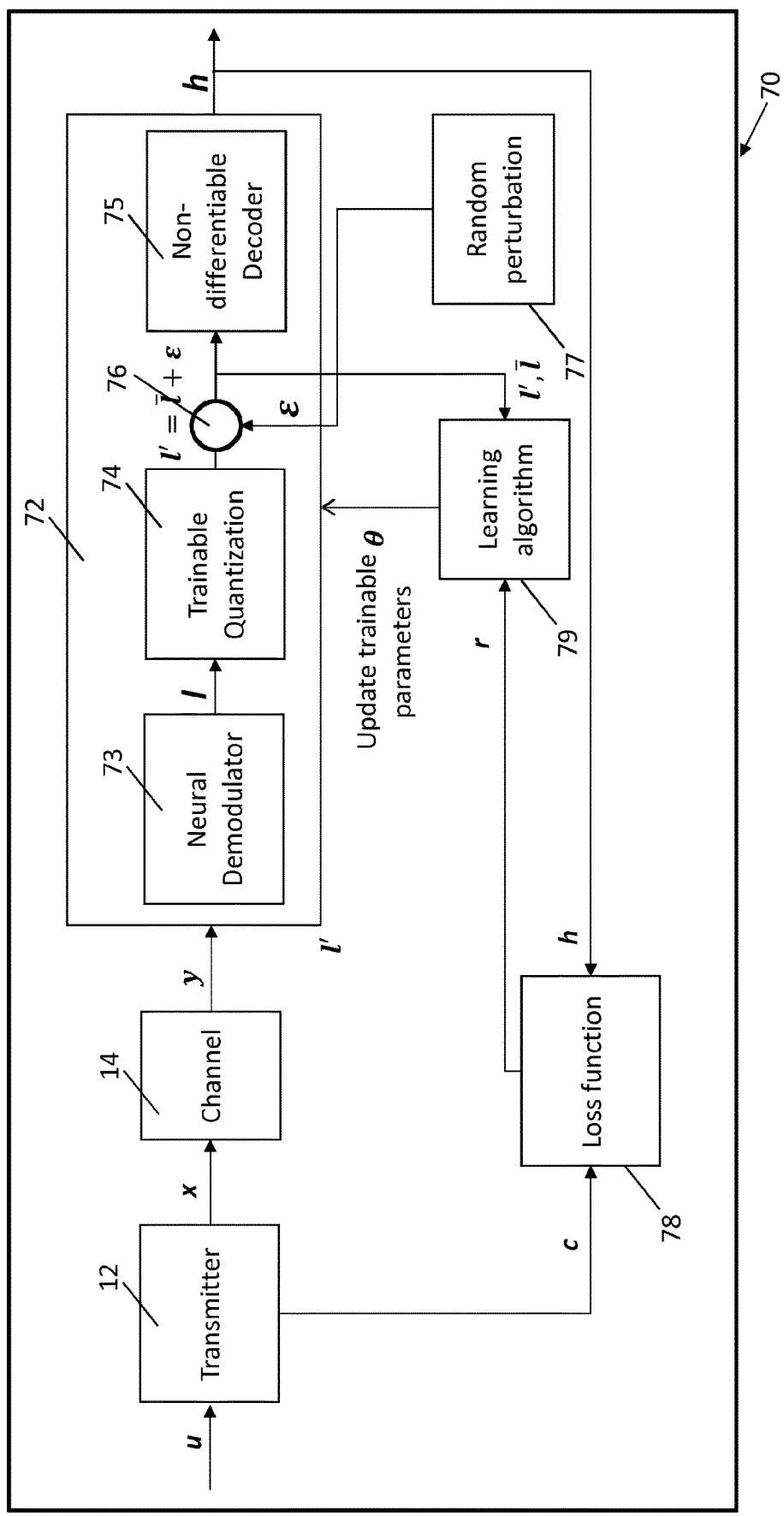
FIG. 7 is a block diagram of an example training system in accordance with an example embodiment.

FIG. 7 is a block diagram of an example training system, indicated generally by the reference numeral 70, in accordance with an example embodiment. The training system 70 has many similarities with the training system 50 described above.

The training system 70 comprises the transmitter 12 and the channel 14 of the system 10 described above and further comprises a receiver 72. The receiver 72 comprises a demodulator 73, a quantization module 74, a decoder 75 and a summing module 76. Thus, the demodulator 73 may be provided for demodulating received symbols (e.g. constellation points) received from a transmitter (such as the transmitter 12), the quantization module 74 may be provided for generating quantized versions of the demodulated symbols and the decoder 75 may be provided for generating a decoded output derived from the quantized versions of the demodulated symbols.

The demodulator 73 and the quantization module 74 may be trainable (e.g. including at least some trainable weights). For example, the trainable weights of the demodulator and the quantization module may be given by $\theta_f$ and $\theta_g$ respectively. As discussed further below, the demodulator 73 and/or the quantization module 74 may include a neural network (or some other differentiable parametric function).

The training system 70 further comprises a loss function module 78 and a learning algorithm module 79 that are similar to the loss function module 52 and learning algorithm module 54 described above. The training system 70 also comprises a perturbation module 77.

As shown in FIG. 7, the output of the quantization module 74 is provided to the input of the summing module 76, together with perturbation vectors provided by the random perturbation module 77. The summing module 76 provides the output of the quantization module, summed with a random noise input (the output of the perturbation module 77), as the input of the decoder 75. The perturbation vectors may, for example, take the form of zero mean Gaussian perturbations.

Figure 8:
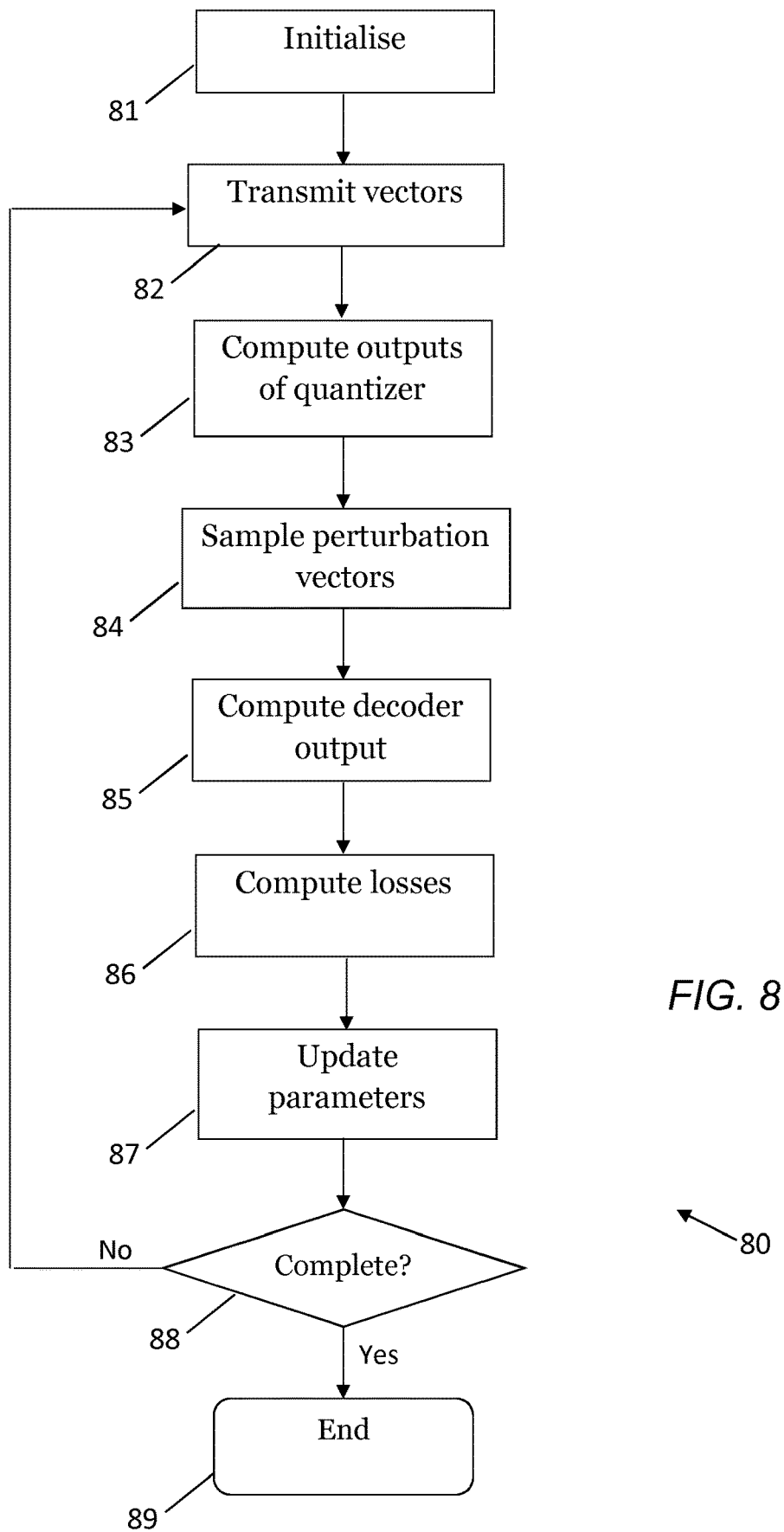
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 has a number of similarities with the algorithm 60 described above.

The algorithm 80 starts at operation 81, where parameters of the receiver 72 are initialised. The initialisation at operation 81 may take many forms, including a random (or pseudo-random) initialisation, or using (or being based on) a previously known receiver configuration. In initialisation operation 81 may involve initialising trainable parameters $\theta$ that may include one or more of the parameters $\theta_f$ and $\theta_g$ (e.g. $\theta=(\theta_f,\theta_g)$).

At operation 82, a set of training vectors are transmitted by the transmitter 12. In order to generate the set of training vectors, a batch of B random binary vectors $u^{(b)}$, b=1, ..., B are generated and transmitted through the channel 14 to the receiver 72. The corresponding vectors of encoded bits are denoted $c^{(b)}$.

At operation 83, the outputs of the trainable quantizer 74 ($\bar{l}^{(b)}$) corresponding to each transmission $y^{(b)}$ are computed (for b=1, ..., B), as illustrated in equation 21.

$$\bar{l}^{(b)} = g_{\theta_g}(f_{\theta_f}(y^{(b)}))$$ Equation 21:

At operation 84, a batch of B perturbation vectors $\varepsilon^{(b)}$, b=1, ..., B is sampled according to the multivariate Gaussian distribution $\mathcal{N}(0, \sigma^2 I_n)$. Other distributions could also be used. The perturbed vectors may then be computed as $l'^{(b)}=\bar{l}^{(b)}+\varepsilon^{(b)}$.

At operation 85, the outputs of the decoder 75 are computed as $h^{(b)}=d_{\theta_d}(l'^{(b)})$ for b=1, ..., B.

At operation 86, a loss function $r^{(b)}$ is obtained or generated for each output. The loss function may be generated based on the first training sequence of messages as received at the loss function module 78 and knowledge of the training sequence as received at the loss function module 78. The loss function may, for example, be related to one or more of block error rate, bit error rate and categorical cross-entropy.

In one example embodiment, the loss function is generated based on mean-squared error, as illustrated in equation 22.

$$r_{MSE}^{(b)}=\|c^{(b)}-h^{(b)}\|_2^2$$ Equation 22:

Alternatively, the loss function may be generated based on cross-entropy (CE), as illustrated in equation 23.

$$r_{CE}^{(b)} = \sum_{\ell=1}^{k} c_\ell^{(b)} \log(h_\ell^{(b)}) + (1-c_\ell^{(b)})\log(1-h_\ell^{(b)}).$$ Equation 23

At operation 87, at least some of the trainable parameters of receiver are updated based on the loss function, for example using stochastic gradient descent or reinforcement learning (e.g. updating at least some of the trainable weights of the demodulation module and/or at least some of the trainable weights of the quantization module). For example, one step of stochastic gradient descent (SGD) may be applied to the trainable parameters (or weights) of the neural network(s).

The operation 87 may involve updated the parameters $\theta$ as:

$$\theta=\theta-\alpha\nabla_\theta L(\theta)$$

where $\alpha>0$ is the learning rate and $L(\theta)$ is given as illustrated in equation 24.

$$L(\theta) = \frac{1}{B}\sum_{b=1}^{B} r^{(b)}\log(p(l'^{(b)}|\bar{l}^{(b)}))$$ Equation 24 where the Gaussian policy is given by equation 25.

$$p(l'^{(b)}|\bar{l}^{(b)}) = \frac{1}{\sqrt{(2\pi\sigma^2)^n}}\exp\left(-\frac{1}{2\sigma^2}\|l'^{(b)}-\bar{l}^{(b)}\|_2^2\right).$$ Equation 25

$\nabla_\theta L(\theta)$ is known as a policy gradient in the field of reinforcement learning and $p(l'^{(b)}|\bar{l}^{(b)})$ is a Gaussian policy. The losses $r^{(b)}$ are considered as constant with respect to the gradient calculation.

At operation 88, a determination is made regarding whether the algorithm 80 is complete. If so, the algorithm terminates at operation 89; otherwise, the algorithm returns to operation 82 and the operations 82 to 88 are repeated. The operation 88 may determine that the algorithm is complete in a number of ways, such as after a number of interactions of the operations 82 to 88 have been completed, if the loss has reached or is below a certain value, if the loss has not decreased over a fixed number of iterations etc.

A number of variants to the embodiments described above will be apparent to those skilled in the art. By way of example, the means for updating at least some of the trainable weights of the quantization module described herein may comprise means for optimising a codebook of the quantization module.

Figure 9:
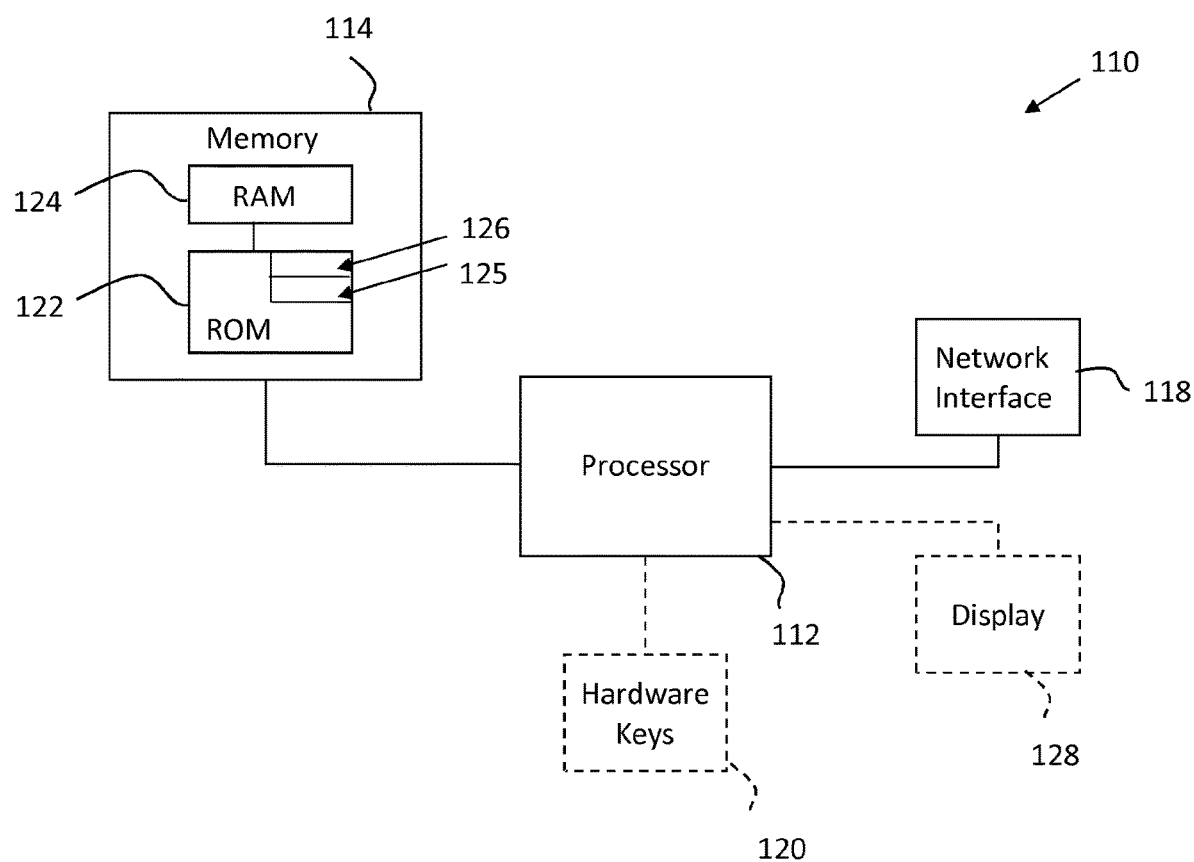
FIG. 9 is a block diagram of components of a system in accordance with an exemplary embodiment.

For completeness, FIG. 9 is a schematic diagram of components of one or more of the modules described previously (e.g. the transmitter or receiver neural networks), which hereafter are referred to generically as processing systems 110. A processing system 110 may have a processor 112, a memory 114 closely coupled to the processor and comprised of a RAM 124 and ROM 122, and, optionally, hardware keys 120 and a display 128. The processing system 110 may comprise one or more network interfaces 118 for connection to a network, e.g. a modem which may be wired or wireless.

The processor 112 is connected to each of the other components in order to control operation thereof.

The memory 114 may comprise a non-volatile memory, a hard disk drive (HDD) or a solid state drive (SSD). The ROM 122 of the memory 114 stores, amongst other things, an operating system 125 and may store software applications 126. The RAM 124 of the memory 114 is used by the processor 112 for the temporary storage of data. The operating system 125 may contain code which, when executed by the processor, implements aspects of the algorithms 60 and 80.

The processor 112 may take any suitable form. For instance, it may be a microcontroller, plural microcontrollers, a processor, or plural processors.

The processing system 110 may be a standalone computer, a server, a console, or a network thereof.

In some embodiments, the processing system 110 may also be associated with external software applications. These may be applications stored on a remote server device and may run partly or exclusively on the remote server device. These applications may be termed cloud-hosted applications. The processing system 110 may be in communication with the remote server device in order to utilize the software application stored there.

Figure 10A:
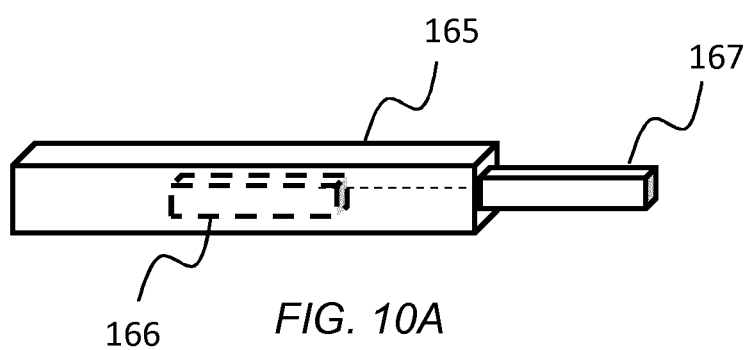
FIGS. 10a and 10b show tangible media, respectively a removable memory unit and a compact disc (CD) storing
Figure 10B:
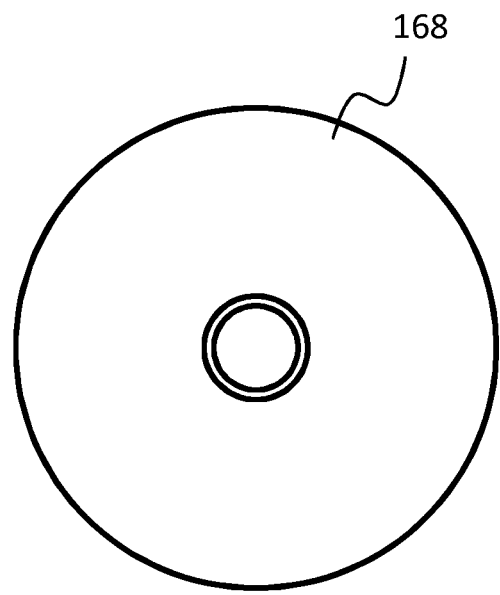

FIGS. 10*a* and 10*b* show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIGS. 6 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
circuitry configured for initialising trainable parameters of a receiver of a transmission system, wherein the receiver comprises a demodulation circuitry for demodulating received symbols, a quantization circuitry for generating quantized versions of the demodulated symbols and a decoder for generating a decoded output derived from the quantized versions of the demodulated symbols, wherein the demodulation circuitry has at least some trainable weights and the quantization circuitry has at least some trainable weights;
circuitry configured for receiving a first training sequence of messages at the receiver;
circuitry configured for obtaining or generating a loss function; and
circuitry configured for updating at least some of the trainable parameters of the receiver based on the loss function, wherein said circuitry configured for updating at least some of the trainable parameters of the receiver comprises circuitry configured for updating at least some of the trainable weights of the demodulation circuitry and circuitry configured for updating at least some of the trainable weights of the quantization circuitry.

2. An apparatus as claimed in claim 1, wherein:
the decoder has at least some trainable weights; and
said circuitry configured for updating at least some of the trainable parameters of the receiver comprises circuitry configured for updating at least some of the trainable weights of the decoder.

3. An apparatus as claimed in claim 1, wherein the demodulation circuitry comprises circuitry configured for generating a log-likelihood ratio estimate for received data bits, wherein each log-likelihood ratio is indicative of the probability that the respective bit, as transmitted, had a particular value.

4. An apparatus as claimed in claim 3, wherein one or more of the trainable weights of the demodulation circuitry comprises one or more trainable weights of the log-likelihood ratio estimate generation circuitry.

5. An apparatus as claimed in claim 1, wherein the quantization circuitry comprises an approximation of a step function, wherein the trainable weights of the quantization circuitry include one or more weights relating to the degree of approximation of the step function.

6. An apparatus as claimed in claim 1, wherein the circuitry configured for updating at least some of the trainable weights of the quantization circuitry comprising circuitry configured for optimising a codebook of the quantization circuitry.

7. An apparatus as claimed in claim 1, further comprising circuitry configured for generating perturbed versions of the quantized versions of the demodulated symbols, wherein the decoder generates the decoded output derived from the perturbed versions of the quantized versions of the demodulated symbols.

8. An apparatus as claimed in claim 7, wherein the circuitry configured for generating perturbed versions of the quantized versions of the demodulated symbols makes use of a distribution to generate perturbations to be applied to the quantized versions of the demodulated symbols.

9. An apparatus as claimed in claim 1, further comprising circuitry configured for repeating the updating of at least some of the trainable parameters of the receiver until a first condition is reached.

10. An apparatus as claimed in claim 1, wherein the loss function is generated based on the first training sequence of messages received at the receiver and knowledge of the training sequence.

11. An apparatus as claimed in claim 1, wherein the loss function is related to one or more of block error rate, bit error rate and categorical cross-entropy.

12. An apparatus as claimed in claim 1, wherein said at least some trainable parameters of the receiver are trained using stochastic gradient descent or reinforcement learning.

13. An apparatus as claimed in claim 1, wherein:
the demodulation circuitry comprises a demodulator neural network; and/or
the quantization circuitry comprises a quantization neural network; and/or
the decoder comprises a decoder neural network.

14. An apparatus as claimed in claim 1, wherein at least one of the circuitry comprise:
at least one processor; and
at least one non-transitory memory including computer program code, the at least one memory and the computer program configured, with the at least one processor, to cause the performance of the apparatus.

15. A method comprising:
initialising trainable parameters of a receiver of a transmission system, wherein the receiver comprises a demodulation circuitry for demodulating received symbols, a quantization circuitry for generating quantized versions of the demodulated symbols and a decoder for generating a decoded output derived from the quantized versions of the demodulated symbols, wherein the demodulation circuitry has at least some trainable weights and the quantization circuitry has at least some trainable weights;
receiving a first training sequence of messages at the receiver;
obtaining or generating a loss function; and
updating at least some of the trainable parameters of the receiver based on the loss function, wherein updating at least some of the trainable parameters of the receiver comprises updating at least some of the trainable weights of the demodulation circuitry and updating at least some of the trainable weights of the quantization circuitry.

16. An apparatus comprising:
at least one processor; and
at least one non-transitory memory including computer program code, the at least one memory and the computer program code configured, with the at least one processor, to:
cause initializing of trainable parameters of a receiver of a transmission system, wherein the receiver comprises circuitry configured for demodulating received symbols, circuitry configured for generating quantized versions of the demodulated symbols, and circuitry configured for generating a decoded output derived from the quantized versions of the demodulated symbols, wherein the circuitry configured for demodulating is configured to demodulate with at least some trainable weights, and wherein the circuitry configured for generating quantized versions of the demodulated symbols is configured to quantize with at least some trainable weights;
cause receiving of a first training sequence of messages at the receiver;
cause obtaining or generating a loss function; and cause updating at least some of the trainable parameters of the receiver based on the loss function, wherein the updating of at least some of the trainable parameters of the receiver comprises updating at least some of the trainable weights of the circuitry configured for demodulating and updating at least some of the trainable weights of the circuitry configured for generating quantized versions of the demodulated symbols.

\* \* \* \* \*